Nov. 1, 1966

E. P. PAPADAKIS 3,283,264

FREQUENCY SELECTIVE SYSTEM

Filed Dec. 24, 1963

INVENTOR
E. P. PAPADAKIS
BY Roy M. Porter Jr.

ATTORNEY 3,283,264
FREQUENCY SELECTIVE SYSTEM
Emmanuel P. Papadakis, Allentown, Pa., assignor to Bell Telephone Laboratories, Incorporated, New York, N.Y., a corporation of New York
Filed Dec. 24, 1963, Ser. No. 333,020
7 Claims. (Cl. 333—6)

This invention relates to frequency selective systems for ultrasonic wave energy and more particularly to simple ultrasonic delay line structures employing the principles of diffraction gratings.

The principles of diffraction gratings are well known especially in the field of optics and efforts have been made to apply these principles also to ultrasonic devices as evidenced by patents to W. P. Mason, 2,408,436 and 2,416,338. All diffraction gratings depend upon the fact that a plane wavefront may be broken up into narrow striations which act as new sources of waves that reinforce each other in definite directions depending upon the spacing of the sources and the wavelength of the energy. Accordingly, as the wavelength varies the direction of reinforcement for a given grating also varies with frequency. Thus, incident waves of a wide band of frequencies are broken up by the grating into components dispersed as a continuous spectrum with each different frequency component directed in a different direction. Ordinarily this separation is not discrete as the position of one frequency blends as part of the continuous spectrum into the positions of other frequencies. Furthermore, the diffraction at each frequency produces a major diffraction lobe and a series of higher order diffraction lobes so that there is the possibility of overlap of the position of a major lobe of a wave of one frequency with the position of minor lobes of other frequencies. Thus, even though an output transducer is located at the nominal position of one frequency its output is the result of many spurious influences. Thus, the frequency discrimination obtained by diffraction gratings has been considered too poor for practical use at ultrasonic frequencies.

It is therefore an object to improve and control the frequency discrimination of ultrasonic diffraction gratings.

It is a further object to simplify the structure of ultrasonic diffraction grating devices.

In accordance with the invention, these objects are accomplished by the use of a diffraction grating many wavelengths long upon which the incident energy is directed at grazing incidence. By this means the diffracted energy of a given frequency is in the form of a beam with the wave front substantially as broad as the grating is long. This beam is received by a piezoelectric output transducer of comparable dimensions, so that only a beam arriving normal to the broad face of the transducer will piezoelectrically excite all portions of this face in the same phase. The transducer is highly selective in its discrimination against beams arriving at slightly different angles from normal which piezoelectrically excite the transducer face in different and cancelling phases. By this means the transducer can discriminate between a band of desired frequencies and undesired frequencies both above and below this band. Both the width and cutoff characteristic of the band thus selected are controllable by the relative grating and transducer lengths and the spacing between them.

These and other objects and features, the nature of the present invention and its various advantages, will appear more fully upon consideration of the specific illustrative embodiments shown in the accompanying drawings and described in detail in the following explanation of these drawings.

Figure 1:
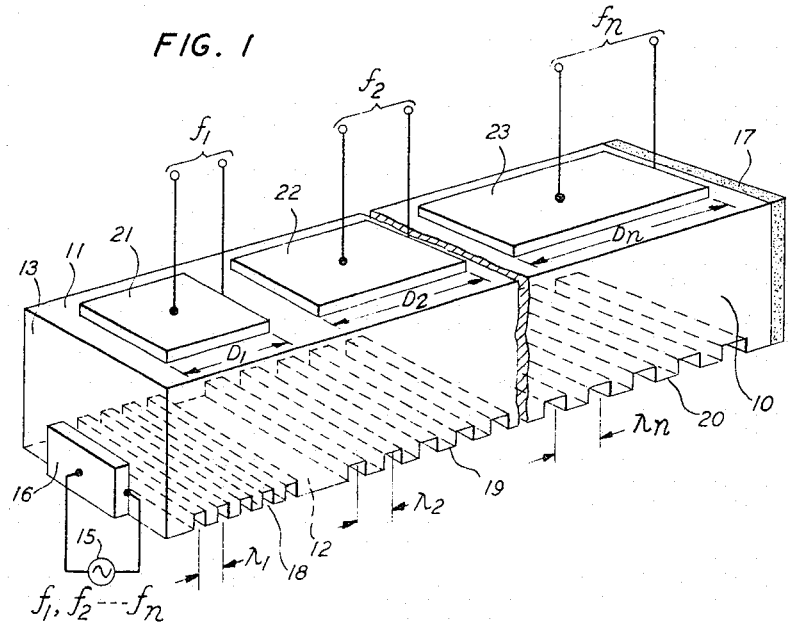
FIG. 1 is a perspective view of an illustrative embodiment of the filter for separating at least three distinct bands of ultrasonic energy.

Referring more particularly to FIG. 1 an illustrative embodiment of the invention is shown comprising a section of delay line 10 in the form of a rectangularly cross-sectioned bar of any suitable ultrasonic propagation material. For example, section 10 may be formed of an isotropic material such as glass or vitreous silica or a metal alloy of grain size small compared to the wavelength of the elastic wave to be carried. The top and bottom surfaces 11 and 12, respectively, are parallel and spaced apart by a distance of many wavelengths.

Means are provided at the left-hand end 13 of line 10 for launching a multifrequency wave of ultrasonic wave energy propagating therein along a path adjacent to and substantially parallel to wall 12 and parallel to the longitudinal axis of line 10. As illustrated, this means comprises an electrical source 15 of signals including at least the different frequencies $f_1$, $f_2$ and $f_n$ applied to a conventional piezoelectric crystal or ceramic transducer 16 bonded to end face 13 at a location below the transverse center line of face 13. In accordance with a preferred embodiment transducer 16 is poled in the thickness direction, provided with electrodes and suitably bonded to face 13 with the poling direction parallel to the longitudinal axis of line 10 so as to produce vibrations in the longitudinal mode.

The end of line 10 opposite transducer 16 is provided with an acoustical wave absorber 17 of known type comprising a layer of acoustically soft material such as lead, hard rubber, adhesive-backed cloth or plastic tape that absorbs and dissipates acoustical energy reaching it without reflection. Similarly, the front and back surfaces of bar 10 may be also loaded with ultrasonic absorbing or dissipating material.

A plurality of output transducers 21, 22 and 23 are located at longitudinally spaced points along surface 11. Each of these transducers may be identical to transducer 16 in which case they all respond to longitudinally modes of ultrasonic vibration. When transducer 16 produces a shear mode vibration with the direction of particle motion parallel to surface 11, transducers 21, 22 and 23 should likewise respond to similarly directed shear modes. If transducer 16 produces a shear mode with particle motion normal to surface 11, the waves reaching the transducers 21, 22 and 23 will be longitudinal in form and transducers 21, 22 and 23 should respond to these modes. Regardless of form, however, transducers 21, 22 and 23 have longitudinal extents $D_1$, $D_2$ and $D_n$, respectively, along line 10 which are each a multiple of wavelengths long and are determined as will be set out hereinafter in relation to the band of frequencies $f_1$, $f_2$ and $f_n$, respectively, to be received by that particular transducer.

A plurality of diffraction gratings 18, 19 and 20 in accordance with the invention are disposed along surface 12 at points transversely opposite transducers 21, 22 and 23, respectively. The plane of each grating is substantially aligned with transducer 16 so that this plane is located substantially in and parallel to the path of the main lobe of ultrasonic energy from transducer 16. Thus, this energy strikes the gratings at grazing incidence in accordance with the invention. In addition to producing a diffracted beam of broad wavefront, grazing incidence further avoids spurious mirror type reflections from the grating surface.

The construction of each grating is such that the band of ultrasonic wave energy centered about the frequency $f_1$ will be diffracted as a beam traveling in a direction normal to the plane of grating 18 and will be received by transducer 21; a wave centered about the frequency $f_2$ as a beam traveling in a direction normal to the plane of grating 19 to be received by transducer 22; and a wave centered about the frequency $f_n$ in a direction normal to the plane of grating 20 to be received by transducer 23.

Figure 2:
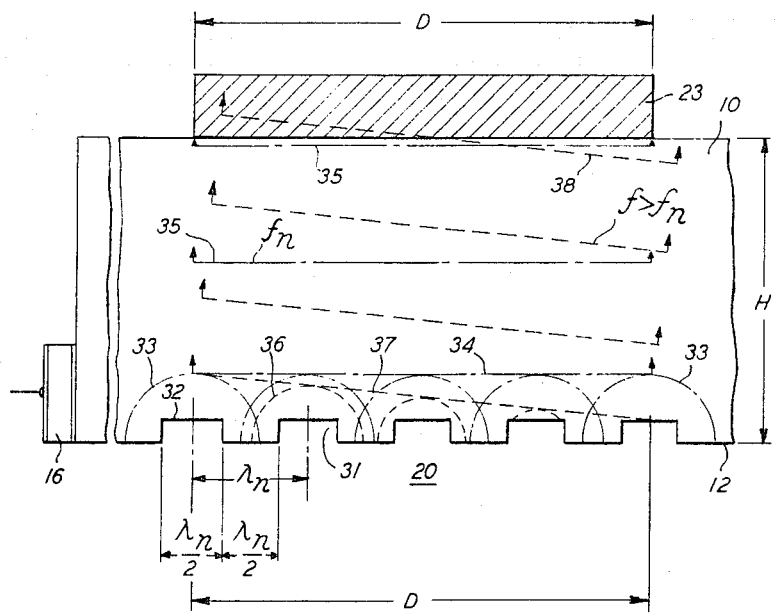
FIG. 2 is a detailed view of one diffraction grating-output transducer combination of FIG. 1 and is used to explain the operation of the invention.

Further details of these gratings and the relationship of each to its associated transducer may be better seen from FIG. 2 which illustrates these details with respect to grating 20 which diffracts the frequency $f_n$. Thus, it will be seen that grating 20 comprises a plurality of transversely extending discontinuities 32 in surface 12 formed, in the particular embodiment illustrated, by a plurality of parallel grooves 31, milled or otherwise cut in surface 12 to form a periodic reflecting surface. Thus, the root surface of the grooves 31 become the plane of the grating referred to above. The centers of the grooves 31 are spaced $\lambda_n$ or one wavelength apart at the frequency $f_n$ and this distance will be referred to hereinafter as the grating spacing. In addition, the width of each groove is preferably $\lambda_n/2$ to minimize reflection of harmonics and the depth of each groove is less than $\lambda_n/4$ and preferably $\lambda_n/10$. A greater depth appears to produce an undesirable "shadow" upon successive grooves. The dimensions of the discontinuities in gratings 18 and 19 are correspondingly scaled with respect to the frequencies $f_1$ and $f_2$, respectively.

Following the analysis known in classical optics as Huygen's Principle, each discontinuity acts as a virtual source, the phase of which is represented by Huygen's circles 33 of radii representing a given phase progression of the secondary radiation. Since the discontinuities are spaced one wavelength at the frequency $f_n$, each source is in phase as indicated by the equal radii of circles 33. A line 34 drawn tangent to circles 33 therefore represents a wavefront extending across all discontinuities 32 and moving in a direction normal to the plane thereof. Further, lines 35 parallel to 34 represent successive high pressure peaks of this wave. Thus, all points on the face of transducer 23 are subjected to the same tension or compression simultaneously and the piezoelectric response thereof produces an electrical output from the transducer representative of the signal $f_n$.

A frequency greater than $f_n$ has a wavelength that is less than the spacing between the discontinuities. Therefore, the phase of each successive virtual source is later than the one just preceding it. This is represented on FIG. 2 by the broken line Huygen's circles 36 of successively decreasing radii as the distance from transducer 16 increases. A line 37 drawn tangent to circles 36 therefore represents a wavefront moving in a direction at an acute angle to the plane of the grating. Further lines 38 parallel to 37 represent successive high pressure peaks of this wave. Since such a wavefront enters the face of transducer 23 obliquely and since the longitudinal extent of the transducer is a plurality of wavelengths, different parts of the transducer experience different degrees of tension or compression so that the piezoelectric response of one part tends to cancel the piezoelectric response of another part thereby providing the desired discrimination between the wanted frequency $f_n$ and the undesired frequency greater than $f_n$. This discrimination is in the form of a sharply defined bandpass characteristic as shown in FIG. 3 with bandwidth and cut-off controllable by the parameters of the system now to be examined with reference to a typical amplitude versus frequency characteristic.

Figure 3:
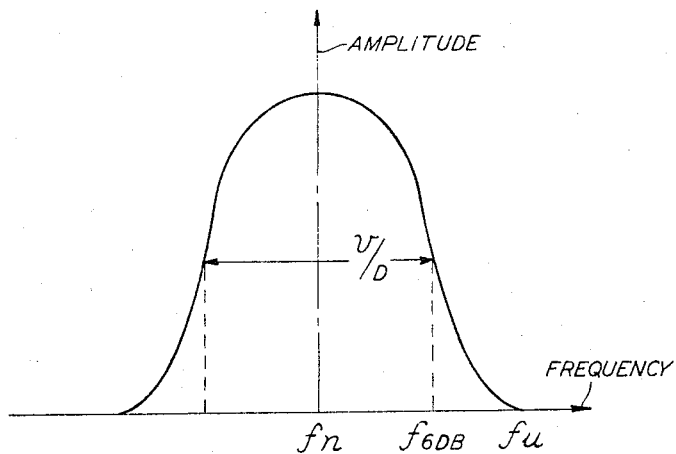
FIG. 3 is a typical bandpass characteristic in accordance with the invention.

As shown on FIG. 3, the center frequency $f_n$ is a frequency for which the discontinuity spacing is one wavelength or $v/\lambda_n$ where $v$ is the velocity of sound in the ultrasonic material. By means of a straightforward geometrical analysis which, however, involves equations too awkward to warrant setting them out in detail here, it may be shown that the frequencies at which the output response is 6DB down from its amplitude at $f_n$ is:

$$f6DB = f_n \pm v/2D \qquad (1)$$

where D is the total longitudinal length of the grating. Thus, the total bandwidth between the 6DB points above and below $f_n$ is:

$$\text{Bandwidth}_{6DB} = \frac{v}{D} = \frac{\lambda_n f_n}{D} \qquad (2)$$

Similarly, it may be shown that the upper cut-off frequency $f_u$ where the output has fallen to a very small value is:

$$f_u = \frac{f_n}{1 - \frac{1}{\sqrt{1 + \frac{H^2}{D^2}}}} \qquad (3)$$

where H is the vertical distance between the output transducer and the grating surface. Thus, the bandwidth between upper and lower cut-off frequencies is:

$$\text{Bandwidth}_{f_u} = \frac{2f_n}{\sqrt{1 + \frac{H^2}{D^2}}} \qquad (4)$$

It is thus seen that the bandwidth of the useful bandpass characteristic may be readily selected by the choice of D according to Equation 2 and that the sharpness of the cut-off characteristic may be increased by increasing H with respect to D according to Equation 4. However, H cannot be increased beyond that distance from the grating known as the Fresnel length for which the diffracted energy maintains a substantially plane wavefront as it arrives at the output transducer. The plane wavefront can be shown to exist so long as:

$$(H/D)/(D/\lambda_n) < 1/2 \qquad (5)$$

Thus, in a particular embodiment where $D/\lambda_n$ is 10 for a desired bandwidth characteristic in accordance with Equation 1, $H/D$ can be no larger than 5. This, however, provides a band discrimination characteristic at least as good as conventional lumped constant filters of ordinary design.

When a plurality of such diffraction gratings are cascaded, as shown in FIG. 1, each being designed to diffract a distinct band of frequencies towards its associated transducer, the multifrequency input signal is divided into distinct bands each of which appears independently at each output transducer. Each band has a time delay proportional to the sum of the distance from the input to its grating and the distance from this grating to its output transducer. The order in which the highest frequency band, the lowest frequency band, or any intermediate band is diffracted and the distance from the input at which this diffraction occurs may be arbitrarily selected to produce any desired delay characteristic. The output transducers may be connected in parallel or a single transducer extending across the full length of the surface 11 may be used without affecting the time separation between the frequency bands.

Figure 4:
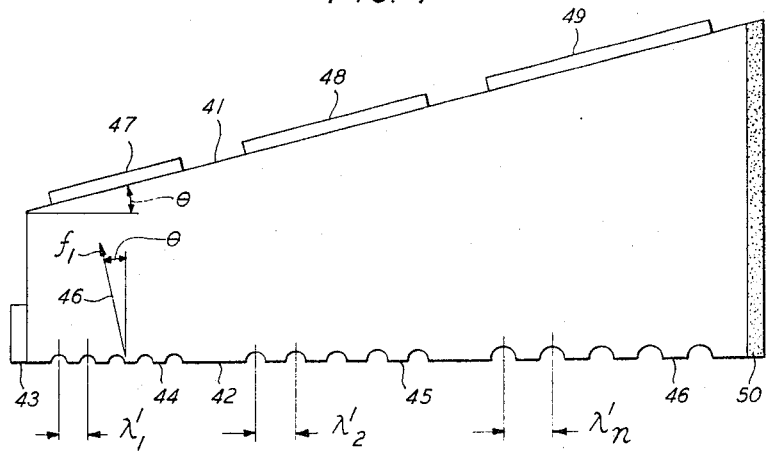
FIG. 4 shows a modification of the invention by means of which the phase dispersion between several bands of ultrasonic energy may be modified.

The time separation may be increased or decreased by the techniques illustrated in FIG. 4. In particular, FIG. 4 illustrates how the time separation may be increased by delaying the lower frequency components even more with respect to the high frequency components. Thus, the delay medium has nonparallel top and bottom surfaces 41 and 42, the distance between which increases in proportion to the distance from input transducer 43 as a function of the angle $\theta$. A grating 44 nearest transducer 43 has a discontinuity spacing $\lambda'_1$ which diffracts the highest frequency band $f_1$ in a direction as represented by arrow 46 which makes an angle equal to $\theta$ between the normal to the grating plane so that the wave arrives at transducer 47 normal to its surface. Analysis will show that the spacing $\lambda'_1$ should be slightly less than the wavelength $\lambda_1$ such that:

$$\frac{\lambda'_1 - \lambda_1}{\lambda'_1} = \sin \theta \quad (6)$$

Dimensions of subsequent gratings 45 and 46 should be similarly proportioned to diffract $\lambda_2$ and $\lambda_n$, respectively, towards transducers 48 and 49. In operation the highest frequency band $\lambda_1$ will be received at transducers 47 with a time delay equal to the travel time from transducer 43 to grating 44 plus the travel time from grating 44 to transducer 47. At the other end of the frequency spectrum the band $\lambda_n$ will arrive at transducer 49 with a time delay equal to the travel time from transducer 43 to grating 46 plus the travel time from grating 46 to transducer 49. Intermediate frequencies will, of course, experience intermediate delays. By increasing the angle $\theta$ the phase difference or dispersion between the low and high frequency bands may be increased.

A further advantage residing in the configuration of FIG. 4 is that mirror type reflections from either the output transducers or from one of the gratings or a series of reflections from both never return to an output transducer with the normal incidence necessary to produce a response in that transducer. Instead, these reflections continue until they are ultimately absorbed by dissipating member 50.

It should be apparent that the lower frequency grating 46 could be located adjacent to transducer 43 and the higher frequency remote therefrom to produce a complementary dispersion between the frequency bands. Furthermore, if transducer 44 and absorber 50 are reversed in position on delay medium 41, the several frequency bands will emerge at their respective transducers in the same time phase when the distances between transducer 43 and each output transducer by way of its associated grating are equal.

As particularly illustrated in FIG. 4, the profile of each discontinuity of gratings 44, 45 and 46 is in the form of a one-half period cosine function which improves discrimination against harmonic generation by the grating. While difficult to form by readily available machining techniques, a full period cosine grating would give maximum discrimination against these harmonies. In a practical embodiment, however, it is sufficient to approximate either the half period or full period cosine profile by any readily formed curve or near curve surface.

In my copending application with another, Serial No. 333,021, filed on an even date herewith, it is disclosed and claimed how a single grating may have a spacing between adjacent discontinuities that changes as a function of distance from the input transducer to produce a desired dispersive characteristic. These principles may likewise be applied to the embodiment of FIG. 4 herein.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. A frequency selective system comprising a propagation medium for ultrasonic wave energy in a given frequency band, an ultrasonic diffraction grating associated with said medium, said grating extending in a given plane for a length of at least a plurality of wavelengths of energy in said band, means for launching a predominant beam of ultrasonic wave in said medium directed parallel to said given plane and therefore at grazing incidence to said grating whereby energy in said given band is diffracted by said grating as a broad wave front moving in a given direction, and a piezoelectric transducer for converting ultrasonic wave energy into electrical signals, said transducer having the piezoelectric face thereof of length extending in a given plane for a plurality of wavelengths of said energy in said band in a direction substantially normal to said given direction.

2. The system according to claim 1 wherein said grating comprises a periodic reflecting surface.

3. The system according to claim 1 wherein said grating comprises a plurality of reflecting discontinuities spaced apart one wavelength of energy in said band, and wherein the plane of said grating is parallel to the face of said transducer.

4. The systems according to claim 1 wherein said grating comprises a plurality of reflecting discontinuities spaced apart by a distance $\lambda'$ and wherein the plane of said grating makes an angle $\theta$ with the face of said transducer such that $$\frac{\lambda' - \lambda}{\lambda'} = \sin \theta$$

where $\lambda$ is a wavelength within said band.

5. The system according to claim 1 wherein said given band has a given width measured between points six db down from the center of said band, and wherein said lengths of said grating and said transducer are substantially equal to the velocity of ultrasonic energy in said medium divided by said given width.

6. A frequency selective system comprising an elongated ultrasonic propagation medium, means for launching a wave of multifrequency ultrasonic energy upon said medium for propagation therein along a longitudinal path, a first and second plurality of discontinuities successively distributed longitudinally along said medium at the edge of said path, the discontinuities of said first plurality being spaced apart by a distance substantially equal to one wavelength of a first frequency within said multifrequency energy and said second plurality being spaced apart by a distance substantially equal to one wavelength of a second and different frequency within said multifrequency energy, first and second transducer means located respectively transversely opposite said first and second plurality for converting ultrasonic wave energy into electrical signals, and means connected to said first and second transducers respectively for utilizing frequencies including said first and second frequencies.

7. A frequency selective system comprising an elongated ultrasonic propagation medium, means for launching a wave of multifrequency ultrasonic energy upon said medium for propagation therein along a longitudinal path, a first and second plurality of discontinuities successively distributed longitudinally along said medium at the edge of said path, the discontinuities of said first plurality being spaced apart by a distance slightly different from one wavelength of a first frequency within said multifrequency energy and said second plurality being spaced apart by a distance slightly different from one wavelength of a second and different frequency within said multifrequency energy so that wave energy of said first and second frequencies is diffracted by said first and second plurality respectively as beams traveling in directions bearing acute angles to said path, first and second transducer means located respectively in said beams for converting ultrasonic wave energy into electrical signals, and means connected to said first and second transducer respectively for utilizing frequencies including said first and second frequencies.

References Cited by the Examiner

UNITED STATES PATENTS

| | | | |
|---|---|---|---|
| 2,169,304 | 8/1939 | Tournier | 333—72 |
| 2,408,436 | 10/1946 | Mason | 333—30 X |
| 2,416,338 | 2/1947 | Mason | 333—30 X |
| 2,455,389 | 12/1948 | Soller | 333—30 |
| 2,643,286 | 6/1953 | Hurvitz. | |
| 3,070,761 | 12/1962 | Rankin | 333—30 |

FOREIGN PATENTS 988,102   4/1965   Great Britain.

HERMAN KARL SAALBACH, *Primary Examiner.*

P. L. GENSLER, C. BARAFF, *Assistant Examiners.*